S. HARRISON.
THILL-COUPLING.
No. 175,085. Patented March 21, 1876.
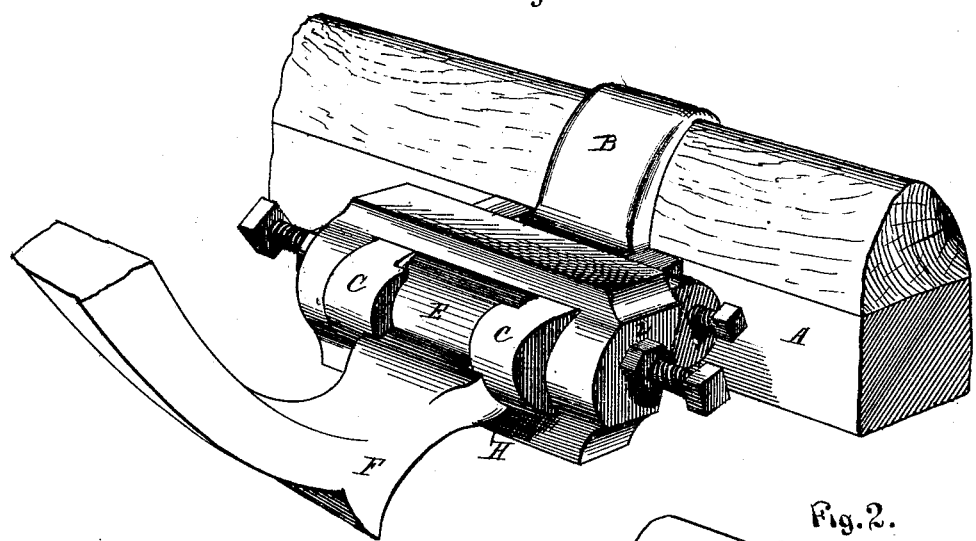
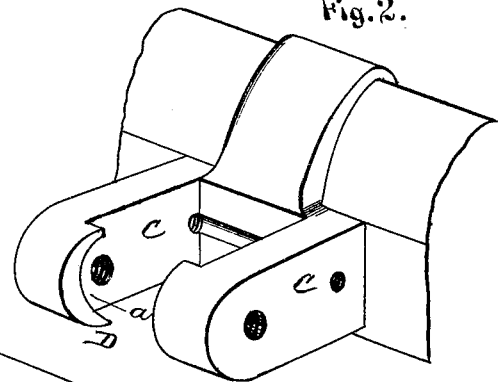
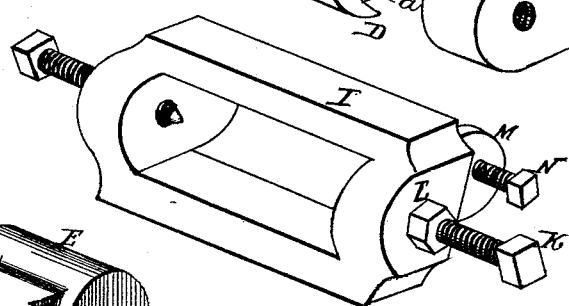
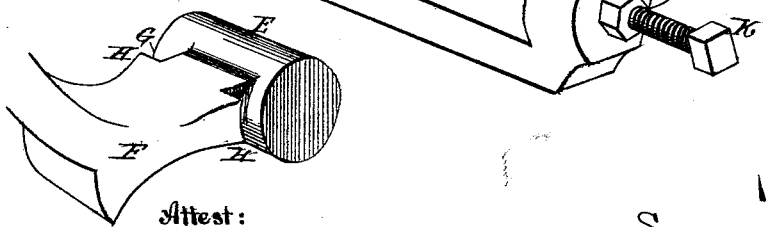
Attest:
Chas. L. Coombs
J. L. Coombs
Inventor:
Simon Harrison
By James L. Norris.
Atty.

UNITED STATES PATENT OFFICE.

SIMON HARRISON, OF JEFFERSONVILLE, INDIANA.

IMPROVEMENT IN THILL-COUPLINGS.

Specification forming part of Letters Patent No. 175,085, dated March 21, 1876; application filed January 14, 1876.

*To all whom it may concern:*

Be it known that I, SIMON HARRISON, of Jeffersonville, in the county of Clarke and State of Indiana, have invented certain new and useful Improvements in Carriage-Shaft Couplings, of which the following is a specification:

This invention relates to a simple and effective method of coupling shafts and poles to carriages, whereby the casual disengagement of the same is prevented, and a firm connection of the various parts is secured.

The invention consists in the provision of a yoke surrounding the coupling-jaws, and made with top and bottom bars, which will effectually prevent the vertical displacement of the shaft-head, the yoke itself being secured in position by means of set-screws, which pass through the yoke and jaws, and enter countersinks in the shaft-head, jam-nuts being applied to the screws outside of the yoke to secure all the parts in position.

The invention further consists in using, as auxiliary means for fastening the yoke, small safety-bolts, which pass through ears on the yoke and enter the coupling-jaws, so that effectual provision is made for retaining the yoke in position, in case the set-screws should work out from any cause whatever.

In the accompanying drawing, Figure 1 is a perspective view, representing my mode of coupling shafts to vehicles. Fig. 2 is a view of the coupling-jaws with the shaft-head and yoke removed. Fig. 3 represents the fastening-yoke, with its screws; and Fig. 4 is a view of the shouldered and notched shaft-iron and its coupling-head.

The axle of a vehicle to which shafts and poles are usually coupled is designated by the letter A, and the customary clip, which serves as the medium for connecting the coupling devices to the axle, is shown by the letter B. The clip is formed with a pair of parallel forwardly-projecting jaws, C, but the same may be made separate and be secured in position by the clip. At the front ends of the jaws are formed inwardly-extending projections D, which are made with rear-curved or concave seats *a*, as shown clearly in Fig. 2. The coupling-head E, formed on the rear end of iron F, which is secured to the shafts, is designed to be inserted between the jaws C, in rear of the projections D, and the seats of the latter will receive said head and permit the same to turn with ease and facility. In order to prevent the coupling-head from moving longitudinally, it is proposed to form the shaft-iron with side recesses G and shoulders H, the recesses receiving the projections of the jaws, and the shoulders bearing against the front faces of the same. I represents a yoke, composed of top and bottom bars connected by lateral cheeks, through which pass set-screws K, which serve to secure the yoke to the coupling-jaws.

The yoke, which is fitted to the jaws so as to surround the same, is designed to prevent the vertical displacement of the shaft iron or coupling-head, the top and bottom bars being situated directly above and below said head, for the object stated.

The set-screws K, which serve to secure the yoke to the coupling-jaws, are made with conical ends, which fit into correspondingly-shaped countersinks in the shaft-head, by means of which said head can be tightened to prevent rattling. Jam-nuts L are applied to the set-screws for retaining the same in position—said nuts bearing against the lateral cheeks of the yoke, as shown in Figs. 1 and 2.

In order to provide additional means for securing the yoke in position, so as to avoid the contingency of a displacement of same in case the set-screws work loose, it is proposed to form rearwardly-projecting ears or projections M on the side cheeks of the yoke, and to pass through said ears small screws or bolts N, which screw into or pass through the coupling-jaws.

Having thus described my invention, what I claim as new, and desire to secure by Letters Patent, is—

1. The detachable yoke I, surrounding the coupling-jaws, for retaining the shaft-head in position, substantially as herein described.

2. In combination with the yoke-jaws and shaft or coupling-head, the set-screws K and jam-nuts L, applied as shown, for the object stated.

3. The retaining yoke, provided with the ears or projections M and safety-bolts N, in combination with the coupling-jaws and shaft-head, as and for the object stated.

In testimony that I claim the foregoing I have hereunto set my hand.

SIMON HARRISON.

Witnesses:
O. A. CLARK,
B. A. JOHNSON.